Patented May 15, 1945

2,375,898

UNITED STATES PATENT OFFICE 2,375,898

PROCESS FOR THE PRODUCTION OF SUB-STANTIALLY ANHYDROUS CALCIUM NITRATE

Hendrik de Bruijn, Geleen, and Mathijs Hubertus Reinier Johannes Plusje, Maastricht, Netherlands; vested in the Alien Property Custodian No Drawing. Application November 19, 1941, Serial No. 419,788. In the Netherlands August 10, 1940

3 Claims. (Cl. 23—293)

Anhydrous calcium nitrate or calcium nitrate of low water content has, as known, attractive properties as fertilizer. It has a high nitrogen content and can take up much moisture before deliquescing.

Nevertheless this product is only produced in industrial scale in small quantities since the preparation from its solutions gives rise to great difficulties. If namely the water content of those solutions has decreased to approximately 24% during concentration a further evaporation in the usual apparatus is impossible due to the high viscosity of the liquid.

The invention provides a process in which these difficulties are overcome.

According to the invention at first calcium nitrate containing less than approximately 10% of water is prepared by stirring together in a mixing apparatus calcium nitrate having a higher water content than 10% and solid calcium nitrate already anhydrous or of low water content after which the mixture is dried.

It has appeared from many experiments that if one only succeeds in decreasing the water content of a calcium nitrate solution or melt or of solid water-containing calcium nitrate to below approximately 10% in the above mentioned mixing, the further dehydration of the calcium nitrate can easily take place.

Though in this method either already during the mixing or during the subsequent drying a product is formed in which the water penetrates to the interior of the granules formed this product surprisingly loses this water easily during the drying process whereas the granule form remains intact.

If the limit of approximately 10% of water should be insufficiently observed and a mixture of a higher water-content should be prepared the troublesome consequences thereof would make themselves felt during the drying following the mixing. In that case the mixture deliquesces in the drying apparatus to a pasty mass adhering to the walls and the devices (stirring arms, partitions, etc.) and thus prevents satisfactory operation.

If by evaporating a calcium nitrate solution a solution having a water content of e. g. 24% has been obtained it is unnecessary that this solution be solidified at first or that the solution be cooled down but this solution can be directly allowed to flow into a mixing-apparatus to which solid, already anhydrous or water-poor calcium nitrate is also added.

For illustrating the invention a continuous process for the production of calcium nitrate having a water content of 1.8% is described by way of example.

A calcium nitrate solution containing 44.5% of water is evaporated till the water content amounts to 24.0%. The solution obtained having a temperature of 148° C. is brought at this temperature and in a quantity of 100 kg. per hour into a trough with a mixing-screw to which also 280 kg. per hour of solid calcium nitrate having a water content of 1.8% are added. By the action of the mixing-screw the mixture is transformed into granules consisting of particles of solid water-poor calcium nitrate cemented by the concentrated calcium nitrate solution. These granules have a water content of 7.6%. After leaving the mixing-screw they are transported to a rotating drying-drum in which they are dehydrated by contact with hot gases of a temperature of about 230° C. The product is sieved and the fraction of 2–4 mm. is removed as final product. This final product consists of hard round globules with a nitrogen content of 16.8% and a water content of 1.8%. The fraction which is too coarse is broken and returned to the mixing-screw together with the fraction which is too fine.

Various changes may be made in the details disclosed in the foregoing specification without departing from the invention or sacrificing the advantages thereof.

We claim:

1. In the manufacture of substantially anhydrous calcium nitrate, the process which comprises mixing together a concentrated calcium nitrate solution with a substantially anhydrous solid calcium nitrate in such proportions that the water content of the mixture is less than about 10 per cent by weight while heating, continuing the mixing until the mass is transformed into granules of solid nitrate cemented by the calcium nitrate solution, then drying the mixture until a substantially anhydrous product is obtained.

2. In the manufacture of substantially anhydrous calcium nitrate, the process which comprises evaporating a calcium nitrate solution until it has a water content of about 24% by weight continuously mixing the hot concentrated solution of calcium nitrate with granular, substantially anhydrous calcium nitrate in such proportions that the resulting mixture contains less than about 10 per cent of water, and passing the resulting mixture through a drying zone supplied with heated air until a substanially anhydrous product is obtained.

3. In the manufacture of substantially anhydrous calcium nitrate, the process which comprises continuously mixing a calcium nitrate solution having a temperature of about 148° C. and a water content of about 24 per cent with sufficient solid, substantially anhydrous calcium nitrate to produce a resulting mixture containing less than about 10 per cent of water, passing the resulting mixture through a heated drying zone until a substantially anhydrous product is obtained and recycling part of the substantially anhydrous product to be mixed with the said calcium nitrate solution.

HENDRIK DE BRUIJN.
MATHIJS HUBERTUS REINIER
JOHANNES PLUSJE.